US007252873B2

(12) United States Patent
Ferrar et al.

(10) Patent No.: US 7,252,873 B2
(45) **Date of Patent: *Aug. 7, 2007**

(54) ELECTROSTATOGRAPHIC APPARATUS HAVING TRANSPORT MEMBER WITH HIGH FRICTION LAYER

(75) Inventors: Wayne T. Ferrar, Fairport, NY (US); Douglas E. Garman, Webster, NY (US); Larry H. Judkins, Rochester, NY (US); Francisco L. Ziegelmuller, Penfield, NY (US); Donald S. Rimai, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 93 days.

This patent is subject to a terminal disclaimer.

(21) Appl. No.: 11/043,774

(22) Filed: Jan. 26, 2005

(65) Prior Publication Data

US 2006/0165974 A1 Jul. 27, 2006

(51) Int. Cl.

| | |
|---|---|
| ***B32B 27/32*** | (2006.01) |
| ***B32B 5/16*** | (2006.01) |
| ***B32B 17/10*** | (2006.01) |
| ***G03G 15/20*** | (2006.01) |

(52) U.S. Cl. ...................... 428/220; 428/323; 428/328; 428/332; 428/339; 428/421; 399/322

(58) Field of Classification Search ................ 428/220, 428/323, 328, 332, 339, 421; 399/322, 326, 399/327, 401

See application file for complete search history.

(56) References Cited

U.S. PATENT DOCUMENTS

| | | | | |
|---|---|---|---|---|
| 4,120,943 | A | 10/1978 | Iwaisako et al. | 423/628 |
| 5,084,735 | A | 1/1992 | Rimai et al. | 355/271 |
| 5,157,445 | A | 10/1992 | Shoji et al. | 355/284 |
| 5,406,364 | A | 4/1995 | Maeyama et al. | 355/296 |
| 5,723,211 | A | 3/1998 | Romano et al. | 428/328 |
| 6,141,522 | A * | 10/2000 | Tsuruoka et al. | 399/302 |
| 6,355,601 | B1 * | 3/2002 | Takenaka et al. | 508/108 |

* cited by examiner

*Primary Examiner*—Sheeba Ahmed
(74) *Attorney, Agent, or Firm*—Lawrence P. Kessler

(57) ABSTRACT

A method for forming a receiver transport member for an electrostatographic reproduction apparatus. The transport member transports receiver members with respect to a fuser assembly and is frictional coupled to a transfer member for driving the transfer member. The method for forming the transport member provides a substrate bearing a high friction layer that includes inorganic particles, with a compound of aluminum selected from the group consisting of aluminum hydroxide, alumina hydrate, aluminum oxide, pseudoboehmite, boehmite alumina, aluminum salts, and mixtures thereof, dispersed in an organic binder so that the high friction layer is capable of preventing a loss of frictional coupling due to release oil applied to a receiver member bearing a fused toner image.

19 Claims, 4 Drawing Sheets

ELECTROSTATOGRAPHIC APPARATUS HAVING TRANSPORT MEMBER WITH HIGH FRICTION LAYER

CROSS-REFERENCE TO RELATED APPLICATION

This invention is related to U.S. patent application Ser. No. 10/965,369, filed on Oct. 14, 2004, entitled: ELECTROSTATOGRAPHIC APPARATUS HAVING TRANSPORT MEMBER WITH RELEASE OIL-ABSORBING LAYER, by Wayne T. Ferrar et al. (which claims the priority of previously filed U.S. Provisional Application Ser. No. 60/523,069, filed on Nov. 18, 2003).

FIELD OF THE INVENTION

This invention relates in general to electrostatographic reproduction apparatus, and more particularly to electrostatographic image reproduction apparatus that includes a receiver member transport web with a high friction layer.

BACKGROUND OF THE INVENTION

An electrostatographic reproduction apparatus, such as electrophotographic printers or copiers, produce image reproductions by transferring pigmented polymeric toner particles to a receiver member from a primary imaging member. An electrostatic latent image is initially formed on the primary imaging member using known techniques, and developed into a visible image by bringing the primary imaging member into close proximity with toner particles, also referred to as marking particles. The toner particles are image-wise attracted to the primary imaging member, thereby forming a visible image on that member. The image is then transferred to a suitable receiver member such as paper, generally upon application of an electric field that urges the toner particles from the primary imaging member to the receiver member. The toned image is then permanently fused (fixed) to the receiver member by subjecting the receiver member to heat and pressure, such as by sending the receiver member through a pair of heated rollers. In order to facilitate release of the toned receiver member from the fuser roller, the fuser roller is generally coated with a thin layer of a release agent, for example generally some sort of silicone oil.

In order to form duplex images, whereby toned images are produced on both sides of a receiver member, it is generally necessary to flip a previously toned and fused receiver member to allow the toned image on the primary imaging member to contact the untoned side of such receiver member. This, however, allows the release agent on the receiver member from the first fusing step to transfer to any contacting elements in the electrostatographic reproduction apparatus. U.S. Pat. No. 5,406,364, issued on Apr. 11, 1995, by Maeyama et al. teaches that porous particles can absorb release agent to clean contaminated surfaces in an electrophotographic apparatus. A cleaner in the form of a web is prepared by immersing a piece of non-woven fabric into a colloidal solution of alumina sol. Polyvinyl alcohol may also be used. The web is used to remove silicone oil from a transfer drum.

It is obvious that in sheet-fed electrostatographic reproduction apparatus, as opposed to a web-fed machine, sheets of the receiver member need to be transported from a holding reservoir for unused receiver members, through the reproduction apparatus, to a bin wherein the image-bearing receiver members are held until they are removed, for example by an operator. Alternatively, the receiver members can be transported into some sort of finishing station such as a collator, folder, etc.

In applications requiring the formation of multi-color images, a plurality of different color toners are used. These different color toners necessitate the formation of separate electrostatic latent images on the primary imaging member and the development of respective electrostatic latent images with the proper colored toner. For example, in full-process color, latent image separations and toner colors corresponding to the subtractive primary colors, cyan, magenta, yellow, and black, are used. These separations must ultimately be transferred to a receiver member in register in order to form the multi-color image reproduction.

In many multicolor electrostatographic or electrophotographic reproduction apparatus, transferring separate colors to a receiver member is accomplished by wrapping the receiver member around an electrically biasable drum. The electrostatic latent image, which had been formed on separate areas of the photoreceptor that correspond to the periodicity of the drum, are each rendered into visible images using the separately colored toner particles. These images are then transferred, in register, to the receiver member. This process, however, has a complicated receiver member path, as the receiver member must be picked up and held by the transfer drum and then released back to the transport mechanism at the appropriate time. This process can be simplified by, first transferring all the separate images, in register, to an intermediate transfer member and then transferring the entire image to the receiver member. In either of these two modes of operation, the output speed of the electrostatographic reproduction apparatus is reduced due to the number of sequential transfers that need to be done.

In another example of color electrostatographic reproduction apparatus, it is preferable to separate the color separation image formation mechanism into separate, substantially identical, modules. This allows each colored image to be printed in parallel, thereby increasing the speed of the reproduction apparatus. In this embodiment, the receiver member is transported from module to module and, while it can be picked up and wrapped around a transfer roller, there generally is no need to do so. Again, it is preferable to first transfer each image to an intermediate transfer member, preferable a compliant transfer intermediate member as described in U.S. Pat. No. 5,084,735, issued on Jan. 28, 1992, by Rimai et al. In order to reduce the time needed to produce a printed image, it is preferred, however, that each color be produced in a separate module comprising a primary imaging member, development station, and transfer apparatus.

In all embodiments, it is necessary to transport the receiver member through the electrostatographic reproduction apparatus. A preferred mode of transport utilizes a transport web, preferably a seamless transport web, to which a receiver member can be attached electrostatically or by any other well known mechanism. When such transport web is employed, in order to facilitate registration of individual developed images on a receiver member, it is preferable to drive all the image forming modules by friction, especially in the case where separate modules are used for the formation, development, and transfer of individual color separation images. This requires that the web have a sufficiently high coefficient of friction during operation. Although many materials may have sufficiently high frictional coefficients initially, the presence of fuser release agents on the receiver member transport web can reduce the friction with usage and result in slippage in a frictionally driven electrostatographic reproduction apparatus. This can result in image defects such as misregistration and general overall unreliability of the reproduction apparatus.

SUMMARY OF THE INVENTION

This invention is directed to a frictionally driven electrostatographic reproduction apparatus, preferably an electrophotographic reproduction apparatus, having color separation producing elements that can be driven by a receiver member transport web without slippage even if the transport web is bearing a fuser release agent such as a silicone oil. This invention is also directed to a material that is coated onto a transport web that imparts non-slippage properties to the transport web.

An endless web supported by two or more rollers can be used as a transport member in an electrophotographic printer to form an endless transport web (ETW). The web can transport image receiver members past image forming and/or transfer members where an image is formed on the receiver member. This image can be an indicia to control the registration of the various imaging members. Alternatively the indicia can be formed directly on the ETW. The timing and the speed of the ETW passing under the imaging member is very important for control to maintain proper registration between successive images on a receiver member. Slippage of the ETW or of the receiver member on the ETW will produce undesirable artifacts in the resultant composite reproduction image. This is especially true when the transport web is used to drive other reproduction apparatus elements, such as primary imaging members or intermediate transfer members, through frictional coupling.

The present invention provides a method to eliminate slippage of the intermediate transfer drum against the transport web and thus provides for improved registration of a composite image. However it is not meant to limit these improvements only to these elements in an electrostatographic printer, and could include suppression of slippage between a photoreceptor drum or belt.

According to this invention, a frictionally driven electrostatographic reproduction apparatus has a receiver member transport web element that is frictionally coupled with each module that produces a toned color separation image, preferably a dry toned image, and a fuser assembly with a fuser release agent for fixing developed toner images to form a fused toner image on a receiver member. The receiver member transport web is formed so as to include a substrate and a layer that contains inorganic particles dispersed in an organic binder to form a porous layer. The inorganic particles are pseudo-boehmite, an agglomerated crystalline inorganic sub-oxide that takes the form of plates and needles. The agglomerated crystals are selected so as to be small enough not to interfere with visible light and are therefore transparent or translucent. Voids form when the inorganic particles are placed together which result in pores in coatings of the particles. An organic binder is used to give the layer mechanical integrity.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
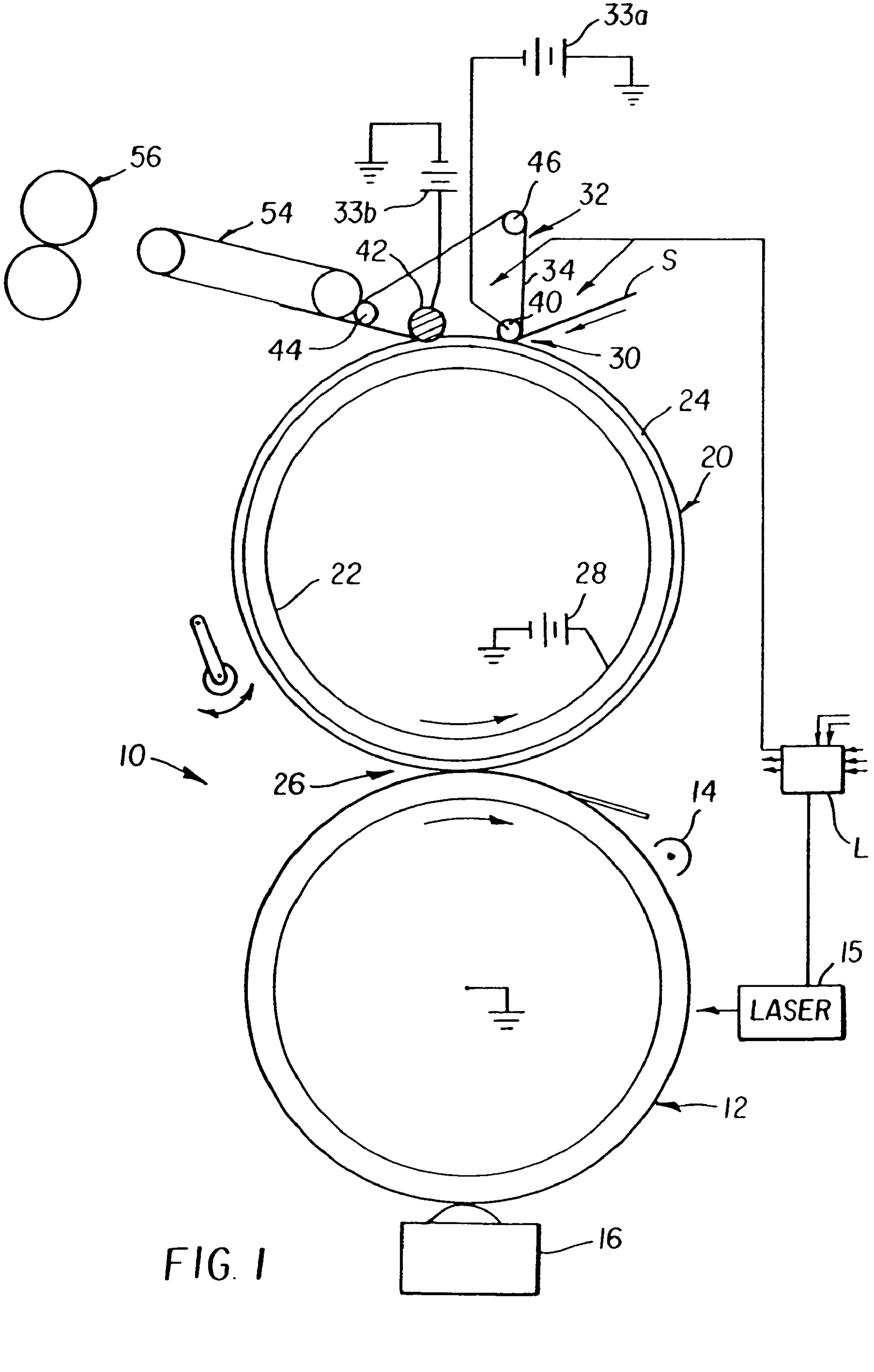
FIG. 1 is a schematic side elevational view of an electrostatographic reproduction apparatus that includes an endless transport web for moving a receiver member to a fuser assembly.

Referring now to the accompanying drawings, FIG. 1 shows an exemplary image-forming electrostatographic reproduction apparatus, designated generally by the numeral 10, that includes a primary image-forming member, for example, a drum 12 having a photoconductive surface, upon which a pigmented marking particle image, or a series of different color marking particle images, is formed. To form images, the outer surface of drum 12 is uniformly charged by a primary charger such as a corona charging device 14, and the uniformly charged surface is exposed by suitable exposure device such as an LED writer 15 to selectively alter the charge on the surface of the drum 12, thereby creating an electrostatic image corresponding to an image to be reproduced. The electrostatic image is developed by application of pigmented marking particles to the image bearing photoconductive drum 12 by a development station 16.

The marking particle image is transferred to the outer surface of a secondary or intermediate image transfer member, for example, an intermediate transfer drum 20 that includes a metallic conductive core 22 and a compliant layer 24 that has relatively low resistivity. With such a relatively conductive intermediate image transfer member drum 20, transfer of the single color marking particle images to the surface of drum 20 can be accomplished with a relatively narrow nip 26 and a relatively modest potential applied by potential source 28.

A single marking particle image, or a multicolor image comprising multiple marking particle images respectively formed on the surface of the intermediate image transfer member drum 20, is transferred in a single step to a receiver S, which is fed into a nip 30 between intermediate image transfer member drum 20 and a transfer backing member 32. The receiver S is fed from a suitable receiver member supply (not shown) into nip 30, where it receives the marking particle image. Receiver S, exits nip 30 and is transported by a transport web 54 to a fuser assembly 56, where the marking particle image is fixed to receiver S by application of heat and/or pressure. Receiver member S bearing the fused image is transported by transport web 54 to a storage location (not shown) or is inverted by a mechanism (not shown) for transfer of a second image to the reverse side of receiver S.

A transfer-backing member 32 that includes an endless support 34 is entrained about a plurality of support members, for example rollers 40, 42, 44, and 46. Support roller 42 is electrically biased by potential source **33*b* to a level sufficient to efficiently urge transfer of marking particle images from intermediate image transfer member drum 20 to receiver member S. At the same time, support roller 40 is electrically biased, for example to ground potential, or electrically connected to source 28 or a separate potential source 33***a*, to a level sufficient to eliminate ionization and premature transfer upstream of nip 30.

Appropriate sensors (not shown) of any well known type are utilized in reproduction apparatus 10 to provide control signals for apparatus 10, which are fed as input information to a logic and control unit L that produces signals for controlling the timing operation of the various electrographic process stations.

To facilitate release of the fixed toner image from fuser assembly 56, a release agent such as silicone oil is applied to imaged receiver S by a mechanism such as depicted in FIG. 1 of the previously cited U.S. Pat. No. 5,157,445, issued on Oct. 20, 1992, by Shoji et al. As already noted, an excess of this oil can be carried to other parts of apparatus 10, especially in the course of duplex printing, resulting in objectionable image artifacts.

In accordance with the present invention, a transport member in an electrostatographic reproduction apparatus 10, depicted in FIG. 1, includes a release oil-absorbing layer disposed on a substrate. Although the transport member is exemplified as a continuous web 54 in FIG. 1, it may take other forms such as, for example, a drum or roller. Apparatus 10 further includes a primary image-forming member, which is exemplified in FIG. 1 as a drum 12 but may be constructed in another form such as, for example, a roller or a belt. The reproduction apparatus optionally includes, operationally associated with the primary image-forming member, an intermediate image transfer member, which is depicted in FIG. 1 as a drum 20 but may also be constructed in another form such as, for example, a roller or a belt.

Figure 2:
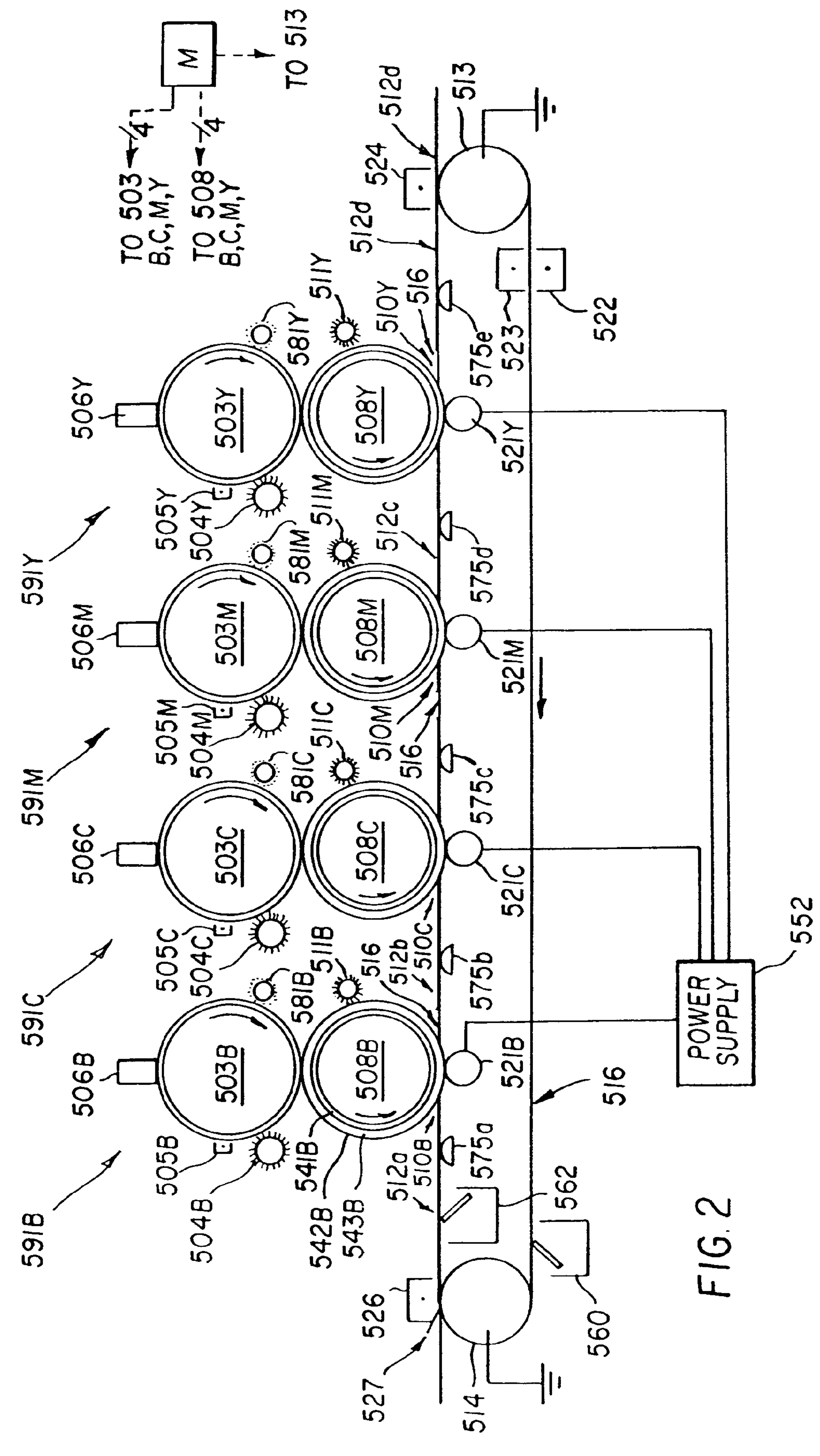
FIG. 2 is a schematic side elevational view of an alternate embodiment of an electrostatographic reproduction apparatus that includes an endless web transport member for moving a receiver member to and from a fuser assembly where four modules work in parallel.

An alternate preferred embodiment of an electrostatographic reproduction apparatus for this invention is shown in FIG. 2. In this alternate embodiment, a receiver member transport web 516 is driven, for example by roller 514. The web drives compliant intermediate transfer members 508B, 508C, 508M, and 508Y through frictional coupling. These members, in turn, drive primary imaging members 503B, 503C, 503M, and 503Y, respectively. While frictional coupling between these members is preferred, coupling can also be accomplished by well-known mechanisms, such as gears, toothed belts, etc.

In this alternate preferred embodiment, toned color separation images corresponding to the subtractive primary colors black, cyan, magenta, and yellow are produced on primary imaging members 503B, 503C, 503M, and 503Y, respectively. These are then electrostatically transferred to compliant imaging members 508B, 508C, 508M, and 508Y, and then electrostatically transferred to the receiver member, in register, while the receiver member, is being transported by the transport web 516. After the final transfer, the composite image-bearing receiver member is transported to a fuser assembly (not shown, but similar to the fuser assembly 56 of FIG. 1).

In order to produce a duplex image, the receiver member with the simplex image is inverted, either mechanically or manually, and again transported on the receiver member transport web with the unimaged side facing the intermediate transport member, through the electrostatographic reproduction apparatus for a second time.

In order to facilitate release from the fusing rollers, the fuser rollers are generally coated with a release agent such as various silicone oils known in the art. When operating in the duplex mode, this oil can contaminate the receiver member transport web and cause slippage in frictionally driven systems. It is a particular advantage of this invention that a pseudo-boehmite coating on the web prevents the release agent contamination from reducing the friction between the web and the driven member(s). That is, according to this invention, the receiver member is transported on a flexible web, preferably a seamless belt including a polymer such as polyester terephthallate (PET) or a polyimide such as Kapton®-H, marketed by DuPont. Although not preferred, metal webs can also be used in this invention. This web is frictionally coupled so as to drive the imaging member or members of the electrostatographic reproduction apparatus while serving as the transport member for the receiver member. The web includes a coating having pseudo-boehmite particles.

Variations of this invention include the use of the pseudo-boehmite bearing transport web to drive an electrostatographic reproduction apparatus wherein the separations are transferred directly from primary imaging members to the receiver member. Another variation on this invention includes reproduction apparatus with more or fewer imaging modules, each module having the capability of producing images containing one or more colors, etc. In yet another variation of this invention, a color image can be fully produced on an electrostatographic reproduction apparatus comprising a single imaging station. In this instance, all separations are produced on a single primary imaging member. These can be transferred, in register, to an electrostatic transfer intermediate member and then electrostatically transferred from that member to the receiver member that is being transported by the receiver member transport web. In yet another variation on the use of this invention, color images can be produced on a single primary imaging member and directly electrostatically transferred from that member to the receiver member. In this case, it is preferable that the transport web releases the receiver member to an electrically biasable transfer roller and the roller frictionally driven by the transport web so that all separations are transferred, in register, to the receiver member. The receiver member is released from the transfer roller back to the transport web. Other variations on the use of this invention should be apparent to one skilled in the art.

Placing a coating of the porous oxide on the web provides advantages compared to an uncoated web. As described in aforementioned related U.S. patent application Ser. No. 10/965,369, image artifacts due to excess fusing oil, are minimized by trapping the fuser oil in the pores of the transport web coating. This invention teaches that with the use of a coating containing pseudo-boehmite particles, the fusing oil does not interfere with the traction of the transport web enabling the transport web to efficiently drive the modules of the reproduction apparatus through friction coupling. To form the release oil-absorbing layer on a substrate, a binder is added to the inorganic particles to obtain a slurry, which is coated on the substrate using, for example, a roll coater, an air knife coater, a blade coater, a rod coater, a bar coater, or a comma coater, and then dried. Preferred coating compositions for the oil-absorbing layer contain pseudo-boehmite and poly(vinyl alcohol) in a weight ratio of about 3:1 to about 20:1.

The inorganic particles included in the oil-absorbing layer preferably comprise compounds of aluminum selected from the group consisting of aluminum hydroxide, alumina hydrate, aluminum oxide, pseudo-boehmite, boehmite alumina, aluminum salts, and mixtures thereof. More preferably, the inorganic particles comprise the alumoxane pseudo-boehmite, a xerogel of boehmite represented by the chemical formula Al(O)OH. Pseudo-boehmite can be prepared by procedures described in, for example, U.S. Pat. No. 4,120,943, issued on Oct. 17, 1978, by Iwaisako et al. and U.S. Pat. No. 5,723,211, issued on Mar. 3, 1998, by Romano et al., the disclosures of which are incorporated herein by reference. The pore characteristics of the xerogel vary depending upon the size and shape of the boehmite colloidal particles. If pseudo-boehmite having a large particle size is used, a layer having a large pore size can be obtained. However larger particles scatter light to various degrees. Smaller particles have smaller pores than the larger particles and tend to be transparent.

An organic binder is employed in the oil-absorbing layer to impart mechanical strength to it. The pore characteristics and transparency of the oil-absorbing layer depend on the particular binder employed. Suitable binders include organic materials such as, for example, starch or one of its modified products, poly(vinyl alcohol) or one of its modified products, SBR latex, NBR latex, cellulose derivatives, quaternary salt polymers ether-substituted poly(phosphazenes), ether-substituted acrylates, ethylene oxide-vinyl alcohol copolymers, poly(vinyl butyral), poly(vinyl formal), poly (oxazolines), aliphatic polyamides, and poly(vinyl pyrrolidone). To the binder, preferably poly(vinyl alcohol), is added inorganic particles, preferably in an amount of about 3 wt. % to about 30 wt. %, more preferably, about 5 wt. % to about 25 wt. % of the inorganic particles. If the amount of binder is less than about 3 wt. %, the strength of the oil-absorbing layer tends to be inadequate. On the other hand, if it exceeds 30 wt. % of the total weight, its porosity tends to be inadequate.

The release oil-absorbing layer of the present invention preferably has a dried thickness of about 1 μm to about 50 μm, more preferably, about 2 μm to about 40 μm. Optionally, the oil-absorbing layer can also incorporate various known additives, including surfactants, pH controllers, anti-foaming agents, lubricants, preservatives, viscosity modifiers, waterproofing agents, dispersing agents, UV absorbing agents, mildew-proofing agents, mordants, antistatic agents, crosslinking agents such as boric acid or borax, and the like. The oil-absorbing layer can also include matting agents such as matte beads comprising crosslinked polystyrene, crosslinked polyacrylate, or polytetrafluoroethylene (TEFLON®) and having a diameter preferably between about 1 μm and about 30 μm, more preferably between about 2 μm and about 20 μm.

A web substrate for the oil-absorbing layer can be opaque, translucent, or transparent and can have a thickness of, preferably about 50 μm to about 500 μm, more preferably, about 75 μm to about 300 μm. The preferred material for the web is poly(ethylene terephthalate) (PET). Antioxidants, antistatic agents, plasticizers and other known additives may be optionally incorporated in the web substrate.

The adhesion of the oil-absorbing layer to the substrate can be improved by corona-discharge treatment of the substrate surface prior to application of the oil-absorbing layer. Alternatively, an undercoating or subbing layer formed from a halogenated phenol or a partially hydrolyzed vinyl chloride-vinyl acetate copolymer and having a thickness (i.e. a dry coat thickness) preferably of less than 2 μm can be applied to the surface of the substrate.

Optionally, an additional backing layer or coating may be applied to the backside of the web substrate, i.e., the side of the substrate opposite the side bearing the oil-absorbing layer, to improve the machine-handling properties of the transport web and controlling the friction and resistivity thereof. Typically, the backing layer comprises a binder and a filler, which can be, for example, amorphous and crystalline silicas, poly(methylmethacrylate), hollow sphere polystyrene beads, microcrystalline cellulose, zinc oxide, talc and the like. The filler included in the backing layer is generally less than 2 wt. % of the binder, and the average particle size of the filler material is in the range of 5 μm to 15 μm. Typical of the binders used in the backing layer are polymeric materials such as gelatin, chitosan, acrylates, methacrylates, polystyrenes, acrylamides, poly(vinyl alcohol), poly(vinyl pyrrolidone), poly(vinyl chloride)-co-poly (vinylacetate), SBR latex, NBR latex, and cellulose derivatives.

The backing layer can further include an antistatic agent such as, for example, dodecylbenzenesulfonate sodium salt, octylsulfonate potassium salt, oligostyrenesulfonate sodium salt, and laurylsulfosuccinate sodium salt. The antistatic agent is added to the backing layer composition in an amount preferably of 0.1 wt. % to 15 wt. %, based on the weight of the binder.

The pseudo-boehmite coating can be formed into an endless web supported by two or more rollers. It can be used as a transport member in an electrophotographic printer to form an endless transport web (ETW). The web can transport image receiver members past image forming and/or transfer members where the image is formed on the receiver member. This image can be an indicia to control the registration of the various imaging members. Alternatively the indicia can be formed directly on the ETW. The timing and the speed of the ETW passing under the imaging member is very important to control to maintain good registration. Slippage of the ETW or of the receiver member on the ETW will produce undesirable image artifacts. This can be especially problematic when the ETW is being used to drive other members such as intermediate transfer members or primary imaging members. This is even more problematic in electrostatographic reproduction apparatus comprising a plurality of image-forming modules such as would be the case for reproduction apparatus capable of producing full-color images by utilizing color separations comprising the subtractive primary colors cyan, magenta, yellow, and black, wherein each separation must be overlaid in register on the final receiver member in order to obtain a sharp image with proper color balance.

Placing the porous oxide coating on the web was found to decrease the slippage of various members against the web as described above. Such members can include drums or rollers such as intermediate transfer members (ITM) or primary imaging member drums. This phenomenon can be demonstrated by measuring the torque of the ITM against coated and uncoated transport webs. A greater force is needed to stall a transfer drum that is being turned by a coated pseudo-boehmite web than by a web that does not have a coating.

The amount of torque required to cause an intermediate transfer member 508 to stop rotating when engaged against a transport web was measured for different pseudo-boehmite samples and an uncoated transport web 516. The stall torque measurements are done with a control intermediate transfer member 508. A control intermediate transfer member 508 is one that had produced high registration errors or web encoder errors due to slippage with the transport web on a machine or a new intermediate transfer member 508 that typically has average surface roughness Ra<0.15 and average peak to valley Rz<1 microns and that has shown low stall torque when tested with an uncoated transport web 516 made of PET. We consider the stall torque low if it is below 2 Nm and preferentially below 1.5 Nm.

The stall torque is measured by coupling a torque transducer or torque watch to the shaft of an primary imaging member 503 that is friction driven by the intermediate transfer member 508 and the intermediate transfer member 508 is friction driven by the web under pressure from a pressure transfer roller 512 as shown in the FIG. 2. The machine is placed under a service mode, purge mode, when the toning station is disengaged from the primary imaging member 503 so there will be no toning and there is no paper feeding. Under this service mode, there is contact between the transport web and the intermediate transfer member 508 and the torque watch is then forced to stall the intermediate transfer member 508 and the peak torque is stored in the transducer. The above procedure is repeated 3 times and the average stall torque is calculated.

The above procedure is used to compare the stall torque capacity between the web for a NexPress 2100 printer and experimental webs with the pseudo-boehmite coating. The results are shown in TABLE 1 and the stall torque force is reported in inch-pounds. The intermediate transfer drum had a surface that was smoother than standard transfer drums.

COMPARATIVE EXAMPLE 1

A transport web that is currently used in a NexPress 2100 printer and does not have a pseudo-boehmite coating had a stall torque of less than 6 inch-pounds. Spinning of the drum was caused by the movement of the transport web against it or over the drum surface. Comparative Example 1 shows that very little force was required to stop the drum from spinning. In other words, the drum was slipping against the moving transport belt.

EXAMPLE 2

Example 2 involved a transport web that had a coating of 90 wt. % pseudo-boehmite and 10 wt. % of GL-03 (Nippon-Gohsei) poly(vinyl alcohol) (PVA) binder. A small amount (0.02 wt. %) of Zonyl®-FSN fluorosurfactant, marketed by DuPont, was added to the coating as a coating aid. A greater force was required to stop the intermediate transfer drum from rotating when the pseudo-boehmite web was used to spin the transfer drum, and the stall torque average for three trials increased to 53.8 inch-pounds. This higher stall torque can be an advantage because image registration will suffer when an intermediate transfer drums slips on the transport web.

EXAMPLE 3

Example 3 was also a pseudo-boehmite coated web that had a KH-20 PVA binder and a higher level of Zonyl®-FSN at 2 wt. %. Higher levels of fluorosurfactant were found to aid in cleaning the web, as explained in the previous patent. Thus there are advantages to adding relatively large amounts of fluorosurfactant for purposes other than coating aids. Fortunately, the stall torque was also high at 58.5 inch-pounds.

EXAMPLE 4

Example 4 used a pseudo-boehmite coated transport web that was similar to the previous example but that contained 4 wt. % Zonyl®-FSN. The stall torque for this web was also large at 59.3 inch-pounds.

EXAMPLE 5

Example 5 used a pseudo-boehmite coated transport web that was similar to the previous example but that contained 6 wt. % Zonyl®-FSN. The stall torque for this web was also large at 55.3 inch-pounds.

EXAMPLE 6

Example 6 used a pseudo-boehmite coated transport web that was the same composition as the previous example but had been run on a NexPress 2100 printer for 60,000 A4 prints. The stall torque for this web was also large at 58.1 inch-pounds. The drum was no more likely to slip than on a new web that had not been exposed to silicone fuser oil, toner, paper dust, and the other contaminants that are normally found in an electophotographic printer.

TABLE 1

| Example | BC drum | Zonyl ®-FSN | Stall Torque (in lbs.) | Avg. |
|---|---|---|---|---|
| Comparative 1 | 3692T | 0% | 5.7, 5.0, 4.7 | |
| 2 | 3692T | 0.02% | 58.2, 53.2, 50.0 | 53.8 |
| 3 | 3692T | 2% | 55.0, 61.0, 59.5 | 58.5 |
| 4 | 3692T | 4% | 56.0, 61.6, 60.3 | 59.3 |
| 5 | 3692T | 6% | 54.8, 57.3, 53.8 | 55.3 |
| 6 | 3692T | 6% | 56.0, 63.1, 55.2 | 58.1 |

While it is not positively known why a coating of pseudo-boehmite in a polymer binder on a web increases the stall torque of a drum against it, one might suspect that the surface roughness of the pseudo-boehmite coated webs might be higher and thus the drums might not slip. The surface roughness of a pseudo-boehmite web (TABLE 2) is greater than for an uncoated web when measured with Mitutoyo SJ-201 Stylus, but not by a great extent. The roughness was measured across the web in 3 locations: front, center and rear, and then one measurement was taken in-track at rear.

TABLE 2

Pseudo-boehmite-PVA coated web with 6 wt. % Zonyl ®-FSN: Measured roughness in three locations across the web (X-T) and one location in-track (I-T)

| | Ra | Ry | Rz | Rp | Rq | Vertical Scale |
|---|---|---|---|---|---|---|
| X-T: Front | 0.21 | 1.32 | 0.95 | 1.03 | 0.27 | 1.0 micron/cm |
| X-T: Center | 0.17 | 0.74 | 0.64 | 0.66 | 0.20 | 0.5 micron/cm |
| X-T: Rear | 0.16 | 0.95 | 0.64 | 0.48 | 0.19 | 0.5 micron/cm |
| I-T: Rear | 0.19 | 0.94 | 0.70 | 0.42 | 0.22 | 1.0 micron/cm |

Ra (Roughness Average)
The arithmetic average height calculated over the entire measured array.
Ry
Ry is the sum of the highest Rp and highest Rv where Rp is the mean to peak, Rv is the mean to valley or the maximum two-point height of the profile.
Rz (Ten-Point Height)
The average of the five greatest peak-to-valley separations.
Rz is the average of the 5 Rz calculated for each sample where:
$Rz1 = Rp1 + Rv1, \ldots, Rz5 = Rp5 + Rv5 \rightarrow Rz = \{Rz1 + \ldots + Rz5\}/5$
Rp (Maximum Profile Height)
The distance between the mean line and the highest point, over the evaluation length, the mean to peak distance.
Rq (Root Mean Square Roughness)
The root mean square average height calculated over the entire measured array.
For each of the 5 samples, there is one Rp and Rv so:
$Ry = \max\{Rp1, \ldots, Rp5\} + \max\{Rv1, \ldots, Rv5\}$ The roughness on three PET webs is given below in TABLE 3 using the same parameters and measured with the same instrument.

TABLE 3

| PET Web | Ra | Ry | Rz | Rp | Vertical Scale |
|---|---|---|---|---|---|
| 1 | 0.05 | 0.37 | 0.32 | 0.26 | 0.2 micron/cm |
| 2 | 0.06 | 1.27 | 0.48 | 0.39 | 0.5 micron/cm |
| 3 | 0.04 | 0.32 | 0.30 | 0.18 | 0.1 micron/cm |

It is also possible that air gaps, that are known to occur in the nip of a transfer roller against a transport belt, may not form as readily when a porous pseudo-boehmite coating is added to the ETW. Another possibility is the resistivity of the pseudo-boehmite may change the ionization potential in the nip of the transfer roller against the pseudo-boehmite coated web and thereby result in the increased stall torque observed with the coated webs.

However what is even more surprising is the increased stall torque obtained with the pseudo-boehmite webs is unaffected by the amount of fluorosurfactant added to the pseudo-boehmite coating. Fluorosurfactants are useful as cleaning aids for inclusion in the oil-absorbing layers, serving to facilitate the removal of toner particles from the surface of the coated substrate. The ability of a pseudo-boehmite coated web to cause the rotation of a intermediate transfer drum placed against it remains about the same regardless of the amount of fluorosurfactant that might be added to a web for some other reason, such as removing the toner. In this way the fluorosurfactant is acting advantageously as a lubricant in regards to removing the toner particles from the porous surface, but is not acting as a lubricant when the same surface is placed against the ITM. The addition of the fluorosurfactant Zonyl®-FSN, a water-soluble, ethoxylated nonionic fluorosurfactant, to the oil-absorbing layer enables the removal of toner particles that cannot be readily removed in the absence of the surfactant. The oil-absorbing layer includes the fluorosurfactant preferably in an amount of about 0.01 wt. % to about 20 wt. %, more preferably, about 0.02 wt. % to about 15 wt. %, of the total weight of inorganic particles and organic binder.

Figure 3:
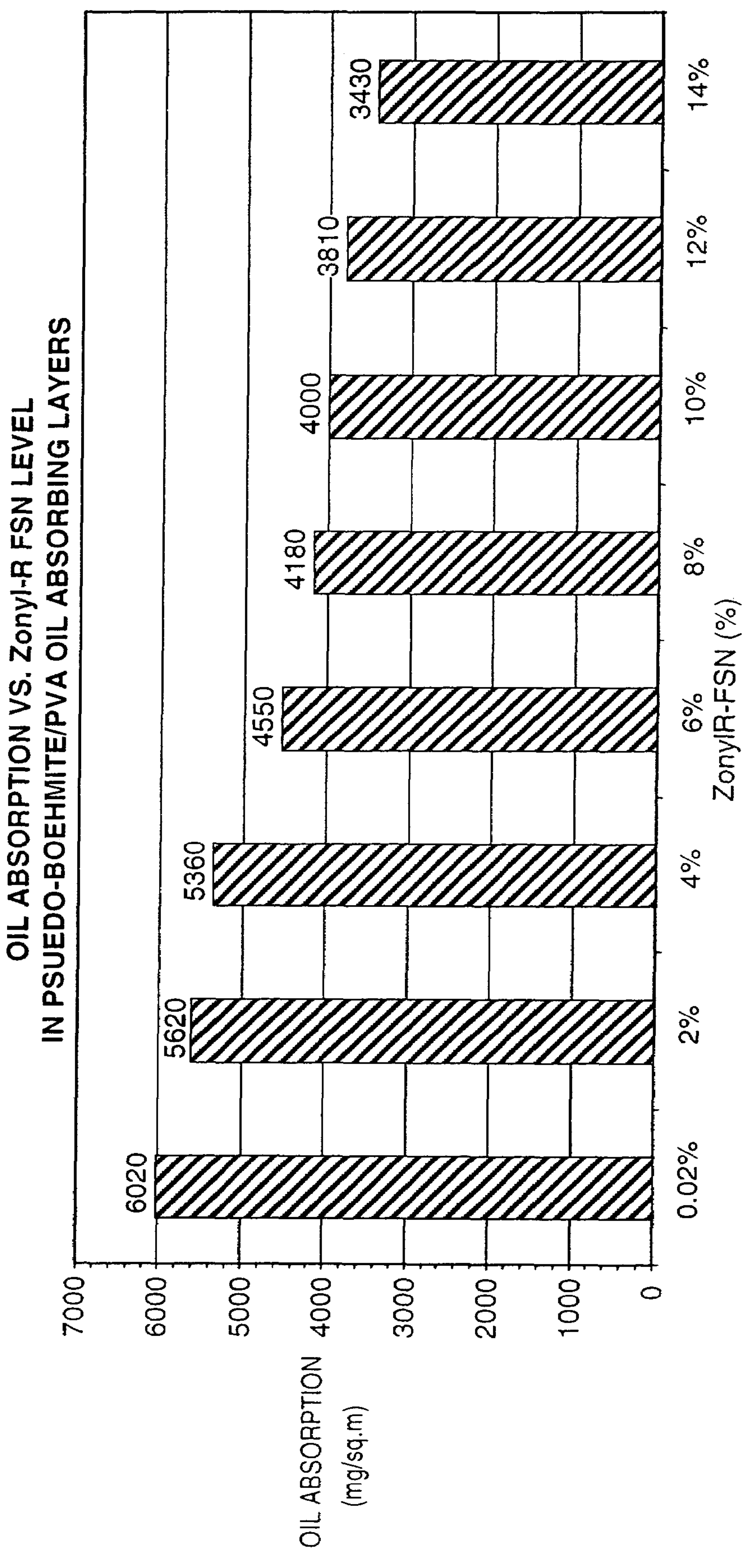
FIG. 3 is a bar chart showing oil absorption versus Zonyl®-FSN level.
Figure 4:
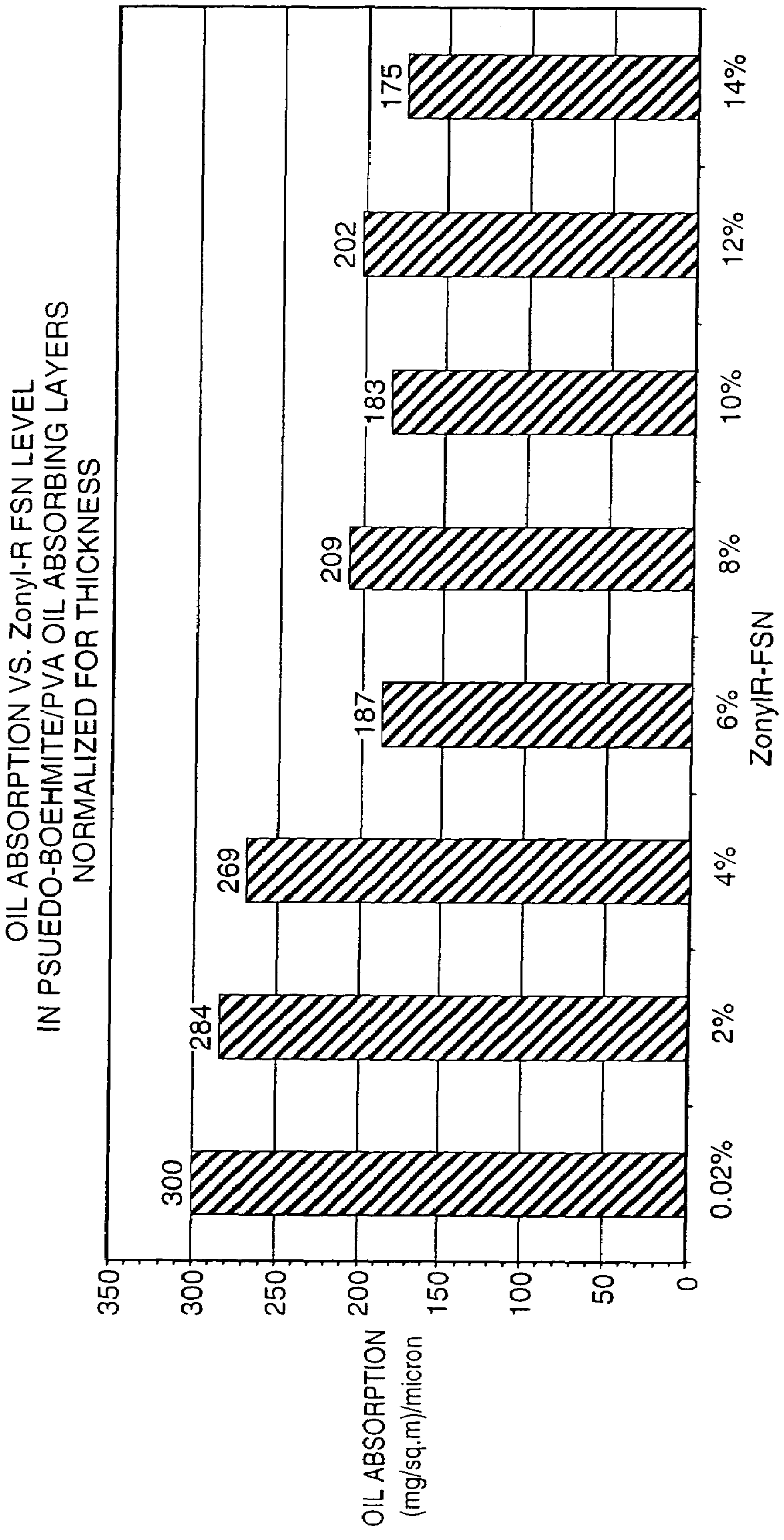
FIG. 4 is a bar chart showing normalized oil versus Zonyl®-FSN level.

The high levels of fluorosurfactant, does lower the amount of oil that can be absorbed by the inorganic particles. This is shown in the two bar charts below, FIGS. 3 and 4. The first chart (FIG. 3) shows that the amount of oil absorbed by the coating after 10 minutes decreased as the amount of fluorosurfactant increased. The coating with almost no fluorosufactant at 0.02% had nearly twice the oil capacity as a coating that had 14 wt. % Zonyl®-FSN added to it. Because the thickness of the coatings varied slightly, the oil absorption was normalized to take the thickness of each coating into account. These results are shown in the second bar chart (FIG. 4). Again, the coating with almost none of the fluorosurfactant has almost twice the oil capacity as the coating with 14 wt. %. Thus the amount of silicone oil that a coating can absorb decreases as the amount of flurosurfactant increases. The clarity of the coatings is not affected by the level of the fluorosurfactant. The fluorosurfactant may be acting in much the same way as the silicone fuser fluid in that the low surface energy materials are being drawn into the pores of the alumina. But neither the level of fluorosurfactant, nor the level of silicone oil in the web, inhibit the high stall values that are observed with the pseudo-boehmite coatings. The stall torques values are insensitive to either surfactant, as shown in TABLE 1 above.

The increasing level of the fluorosurfactant at the surface of the pseudo-boehmite coatings can be monitored using X-ray photoelectron spectroscopy (XPS). This analytical technique produces a map of the elements on the surface of the coating. It can be seen in the TABLE 4 below that the level of fluorine on the surface of the coating increases substantially as the level of Zonyl®-FSN added to the coating is increased. The sample with 2% Zonyl®-FSN has 5.93 atom % fluorine, the sample with 8% Zonyl®-FSN has 14.93 atom % fluorine, and the sample with 14% Zonyl®-FSN has 17.80 atom % fluorine. By comparison, a sample of pure Zonyl®-FSN had 38.24 atom % fluorine in the XPS. Because the Zonyl®-FSN is a waxy material with a low surface energy, the surface of the coating should become slippery in much the same way a car becomes slippery when a wax is applied.

TABLE 4

| | Surface Composition in Atom % | | | | |
|---|---|---|---|---|---|
| Sample | C | O | N | F | Al |
| 2% Zonyl ® | 16.68 | 56.13 | 0.35 | 5.93 | 20.91 |
| 8% Zonyl ® | 18.89 | 47.08 | 0.37 | 14.93 | 18.73 |
| 14% Zonyl ® | 22.27 | 42.92 | 0.27 | 17.80 | 16.74 |
| Zonyl ®-1 Reference Sample | 45.84 | 15.92 | — | 38.24 | — |

Additionally the level of silicone oil on the surface of the transport web is observed to increase as the web is used in the electrophotographic process. However the stall torque is not affected by the increase in silicone surfactant on the surface of the web. Silicones are generally good lubricants in much the same way as the fluorosurfactants.

TABLE 5 summarizes X-ray Photoelectron Spectroscopy (XPS) measurements performed on exercised belt samples described below. The belt has been used for 15 cycles of imaging, which corresponds to 60K A4 prints. The prints were imaged with black stripes as described in the previous patent. The toned area is an area where a black stripe has been imaged on the receiver member, and the untoned area is where the receiver member had not received any image. It is clear that the toned areas deposited much higher levels of fuser oil onto the pseudo-boehmite coated transport belt. The transport belt that had 2% Zonyl®-FSN picked up 5.81 atom % silicon in the area where the stripe from the receiver member contacted the transport belt. The belt that had 4% Zonyl®-FSN had 2.05 silicon in the area where the stripe from the receiver member contacted the transport belt.

TABLE 5

| | Surface Composition in Atom % | | | | | | |
|---|---|---|---|---|---|---|---|
| Sample | C | O | N | F | Al | Si | Ca |
| Toned 60K A4 Prints 2% Zonyl ®-FSN | 36.20 | 40.02 | 0.28 | 7.64 | 9.88 | 5.81 | 0.16 |
| Untoned 60K A4 Prints 2% Zonyl ®-FSN | 34.98 | 45.35 | 0.37 | 4.18 | 14.53 | 0.60 | — |
| Toned 60K A4 Prints 4% Zonyl ®-FSN | 30.64 | 40.68 | 0.25 | 13.93 | 12.46 | 2.05 | — |
| Untoned 60K A4 Prints 4% Zonyl ®-FSN | 24.43 | 48.19 | 0.56 | 10.21 | 16.18 | 0.42 | — |

The increase in the level of silicone oil on the used belt would have been expected to cause an increase in the level of slippage between the transfer roller and the coated belt receiver member. However an increase was not observed as is shown in the stall torque data Example 6 of TABLE 1. Also note that silicon was not detected in the XPS samples of the unused pseudo-boehmite coated transport webs, as with the samples of TABLE 4. This is consistent with the assumption that the silicon is related to the level of fuser oil on the fused prints.

The high and unchanging level of stall torque observed with the transport web against the transfer drum regardless of the level of fluorosurfactant and silicone in the pseudo-boehmite appears to correlate with the coefficient of static friction of the pseudo-boehmite. In this study, the coefficient of static friction was determined by measuring the angle at which a 100 g brass weight, normally used in a balance, began to slide down the web material. The web material was supported by a rigid support that was inclined at a variable inclination angle. The tangent of the angle at which sliding commenced is the coefficient of static friction. To ensure that Amonton's law was obeyed, the measurements were randomly repeated with a 10 g brass weight, with comparable results. TABLE 6 shows the coefficient of the pseudo-boehmite coatings in insensitive to the fluorosurfactant levels. The unsubbed polyester terephthalate (PET) support in the control sample (last data point listed) was the back of RC5-8949-4 and was included for comparative purposes. It is clear from the data that the frictional coefficient between the brass weight and the pseudo-boehmite was approximately 0.58 for all the samples, independent of the concentration of Zonyl®. Overall, the coefficient of static friction for the brass in contact with the pseudo-boehmite is fairly high, as is evident from the fact that the friction of the brass to the PET is slightly less than half of that value. This probably explains why the pseudo-boehmite-coated webs can drive the NexPress 2100 printer transfer drums as well as they do. Moreover, the coefficient of friction is independent of the Zonyl® concentration, which may be somewhat surprising.

TABLE 6

Coefficient of static friction between a brass weight and various substrates.

| Coating Number | Zonyl ® Concentration | Angle | Coefficient of Friction |
|---|---|---|---|
| 1 | 0.02% | 31 | 0.60 |
| 2 | 0.20% | 31 | 0.60 |
| 3 | 2.0% | 31 | 0.60 |
| 4 | 6.0% | 30 | 0.58 |
| 5 | 14.0% | 31 | 0.60 |
| 6 | 4.0% | 30 | 0.58 |
| 7 | 6.0% | 29 | 0.55 |
| 8 | 8.0% | 30 | 0.58 |
| 9 | 10.0% | 29 | 0.55 |
| 10 | 12.0% | 29 | 0.55 |
| 11 | 2.0% | 30 | 0.58 |
| 12 | 2.0% | 31 | 0.60 |
| 13 | 6.0% | 31 | 0.60 |
| Unsubbed PET support | 0.0% | 15 | 0.27 |
| Nickelized PET | 0.0% | 23 | 0.42 |

The friction coefficient measurements described above were repeated with the receiver member transport web material except that, in this case, the effect of a fuser release agent (NexPress 2100 Fuser Oil, marketed by NexPress Solutions, Inc.) was examined. Specifically, a silicone oil used in a electrophotographic reproduction apparatus to release image-bearing receiver members was rolled onto the pseudo-boehmite coated receiver member transport web material and allowed to soak in for several minutes. After a given time, the sample was wiped with a High-Tech Cleaning Cloth marketed by 3M. The friction coefficient, given in TABLE 7, was found not to vary with the presence of the fuser oil. In contrast, when fuser oil was coated onto the bare PET support, the coefficient of friction was found to drop by approximately half, from 0.27 to 0.14. Even the unoiled PET support had a coefficient of friction of only about half of the oiled or unoiled pseudo-boehmite coated material.

TABLE 7

Coefficient of static friction between a brass weight and an alumoxane-coated PET web, as a function of oil-soak time.

| Run Number | Oil Soak Time (minutes) | Coefficient of Friction |
|---|---|---|
| 1 | 0 (control) | 0.58 |
| 2 | 1 | 0.55 |
| 3 | 5 | 0.55 |
| Unsubbed PET Coated With Fuser Oil | — | 0.14 |

The invention has been described in detail with particular reference to certain preferred embodiments thereof, but it will be understood that variations and modifications can be effected within the spirit and scope of the invention.

The invention claimed is:

1. In an electrostatographic reproduction apparatus including a transport member for transporting reproduction receiver members, a method for forming said transport member comprising the steps of:

providing a substrate bearing a high friction layer that includes inorganic particles, with a compound of pseudo-boehmite dispersed in an organic binder of poly(vinyl alcohol), in a weight ratio of about 3:1 to about 20:1, so that said high friction layer is capable of preventing a loss of frictional coupling.

2. The transport member forming method of claim 1, wherein said high friction layer has a dried thickness of about 1 μm to about 50 μm.

3. The transport member forming method of claim 2, wherein said high friction layer has a dried thickness of about 2 μm to about 40 μm.

4. The transport member forming method of claim 2, wherein said high friction layer further comprises a fluorosurfactant.

5. The transport member forming method of claim 4, wherein said fluorosurfactant is a water-soluble, ethoxylated nonionic fluorosurfactant.

6. The transport member forming method of claim 4, wherein said high friction layer contains said fluorosurfactant in an amount of about 0.01 wt. % to about 10 wt. % of the total weight of said inorganic particles and said organic binder.

7. The transport member forming method of claim 6, wherein said high friction layer contains said fluorosurfactant in an amount of about 0.02 wt. % to about 6 wt. % of the total weight of said inorganic particles and said organic binder.

8. The transport member forming method of claim 1, wherein said high friction layer further includes a crosslinking agent.

9. The transport member forming method of claim 8, wherein said crosslinking agent comprises 2,3-dihydroxy-1,4-dioxane.

10. The transport member forming method of claim 8, wherein said crosslinking agent is boric acid.

11. The transport member forming method of claim 8, wherein said crosslinking agent is borax.

12. In an electrostatographic reproduction apparatus including a primary imaging member for producing an electrostatic latent image; a development station for applying toner particles to said latent image; a transfer member for transferring a developed toner image to a receiver member; a fuser assembly, with a fusing member to which a release oil is applied, for fixing said developed toner image, thereby forming a fused toner image on a receiver member; and a transport member for transporting receiver members with respect to said fuser assembly and frictional coupled to said transfer member for driving said transfer member, a method for forming said transport member comprising the steps of:

providing a substrate bearing a high friction layer that includes inorganic particles, with a compound of pseudo-boebmite, dispersed in an organic binder of poly(vinyl alcohol, in a weight ratio of about 3:1 to about 20:1, so that said high friction layer is capable of preventing a loss of frictional coupling due to release oil applied to a receiver member bearing a fused toner image.

13. The transport member forming method of claim 12, wherein said high friction layer includes said organic binder in an amount of about 3 wt. % to about 30 wt. %, of the total weight of said organic binder and said inorganic particles.

14. The transport member forming method of claim 12, wherein said high friction layer has a dried thickness of about 1 μm to about 50 μm.

15. The transport member forming method of claim 14, wherein said high friction layer further comprises a fluorosurfactant.

16. The transport member forming method of claim 15, wherein said fluorosurfactant is a water-soluble, ethoxylated nonionic fluorosurfactant.

17. The transport member forming method of claim 15, wherein said high friction layer contains said fluorosurfactant in an amount of about 0.01 wt. % to about 10 wt. % of the total weight of said inorganic particles and said organic binder.

18. The transport member forming method of claim 12, wherein said high friction layer further includes a crosslinking agent.

19. In an electrostatographic reproduction apparatus including a transport member for transporting reproduction receiver members, a method for forming said transport member comprising the steps of:

providing a substrate bearing a high friction layer that includes inorganic particles, with a compound of-aluminum selected from the group consisting of aluminum hydroxide, alumina hydrate, aluminum oxide, pseudo-boehmite, boehmite alumina, aluminum salts, and mixtures thereof, dispersed in an organic binder of poly (vinyl alcohol)-so that said high friction layer is capable of preventing a loss of frictional coupling.

* * * * *

UNITED STATES PATENT AND TRADEMARK OFFICE

CERTIFICATE OF CORRECTION

PATENT NO. : 7,252,873 B2 
APPLICATION NO. : 11/043774
DATED : August 7, 2007
INVENTOR(S) : Wayne T. Ferrar et al.

It is certified that error appears in the above-identified patent and that said Letters Patent is hereby corrected as shown below:

| | |
|---|---|
| Claim 12, Column 15, Line 17 | In Claim 12, delete "boebmite," and insert -- boehmite, -- |
| Claim 12, Column 15, Line 18 | In Claim 12, delete "alcohol," and insert -- alcohol), -- |

Signed and Sealed this

Twentieth Day of November, 2007

JON W. DUDAS
*Director of the United States Patent and Trademark Office*